(12) United States Patent
Inoue et al.

(10) Patent No.: US 12,319,616 B2
(45) Date of Patent: *Jun. 3, 2025

(54) OPTICAL GLASS, OPTICAL ELEMENT INCLUDING OPTICAL GLASS, AND OPTICAL APPARATUS

(71) Applicants: The University of Tokyo, Tokyo (JP); NIKON CORPORATION, Tokyo (JP)

(72) Inventors: Hiroyuki Inoue, Tokyo (JP); Atsunobu Masuno, Tokyo (JP); Kohei Yoshimoto, Kawasaki (JP); Motoi Ueda, Naka (JP); Hiroshi Yamamoto, Yamato (JP); Tatsunori Kawashima, Sagamihara (JP)

(73) Assignees: THE UNIVERSITY OF TOKYO, Tokyo (JP); NIKON CORPORATION, Tokyo (JP)

( * ) Notice: Subject to any disclaimer, the term of this patent is extended or adjusted under 35 U.S.C. 154(b) by 555 days.

This patent is subject to a terminal disclaimer.

(21) Appl. No.: 17/563,760

(22) Filed: Dec. 28, 2021

(65) Prior Publication Data

US 2022/0119302 A1 Apr. 21, 2022

Related U.S. Application Data

(63) Continuation of application No. 16/283,349, filed on Feb. 22, 2019, now Pat. No. 11,236,009, which is a continuation of application No. PCT/JP2017/026520, filed on Jul. 21, 2017.

(30) Foreign Application Priority Data

Aug. 26, 2016 (JP) ................. 2016-165366

(51) Int. Cl.
| | |
|---|---|
| C03C 3/12 | (2006.01) |
| C03C 3/062 | (2006.01) |
| C03C 3/068 | (2006.01) |
| C03C 3/15 | (2006.01) |
| C03C 3/155 | (2006.01) |
| C03C 3/253 | (2006.01) |
| G02B 1/00 | (2006.01) |

(52) U.S. Cl.
CPC ............... *C03C 3/12* (2013.01); *C03C 3/062* (2013.01); *C03C 3/068* (2013.01); *C03C 3/15* (2013.01); *C03C 3/155* (2013.01); *C03C 3/253* (2013.01); *G02B 1/00* (2013.01)

(58) Field of Classification Search
CPC ........... C03C 3/062; C03C 3/068; C03C 3/15; C03C 3/12; C03C 3/155
See application file for complete search history.

(56) References Cited

U.S. PATENT DOCUMENTS

| | | | |
|---|---|---|---|
| 5,232,879 A | 8/1993 | Hoaglin et al. | |
| 5,392,376 A | 2/1995 | Aitken et al. | |
| 11,236,099 B2 * | 2/2022 | Takami | A61K 31/4355 |
| 2008/0248941 A1 | 10/2008 | Fu | |

FOREIGN PATENT DOCUMENTS

| | | | | |
|---|---|---|---|---|
| CN | 1116190 A | 2/1996 | | |
| CN | 101279816 A | 10/2008 | | |
| JP | 7-81973 | 3/1995 | | |
| JP | 8-310830 A | 11/1996 | | |
| JP | 2005-154251 A | 6/2005 | | |
| JP | 2005-272194 A | 10/2005 | | |
| JP | 2006-131450 A | 5/2006 | | |
| JP | 2006256959 A | * | 9/2006 | ............ C03C 3/068 |
| JP | 2008-56554 A | 3/2008 | | |
| JP | 2008-69047 A | 3/2008 | | |
| JP | 2009-96645 A | 5/2009 | | |
| JP | 2012-250900 A | 12/2012 | | |
| WO | WO 2012/046833 A1 | 4/2012 | | |

OTHER PUBLICATIONS

Japanese Office Action dated Apr. 4, 2023 for Japanese Application No. 2022-063843.
Chinese Office Action dated Dec. 13, 2023 for counterpart Chinese Application No. 202210393403.1.
Office Action, dated Aug. 16, 2021, in corresponding Chinese Patent Application No. 201780049727.0 (15 pp.).
Decision of Dismissal of Amendment, dated Jan. 11, 2022, in corresponding Japanese Patent Application No. 2018-535535 (4 pp.).
Decision of Refusal, dated Jan. 11, 2022, in corresponding Japanese Patent Application No. 2018-535535 (2 pp.).
Schroeder, J., et al., "Raman scattering and Boson peaks in glasses: temperature and pressure effects", Journal of Non-Crystalline Solids, vol. 349, Oct. 28, 2004, pp. 88-97.
Takahashi, Y., et al., "Formation of Langasite-Type Crystals in Corresponding Glasses and Their Second-Order Optical Nonlinearities", Journal of the Ceramic Society of Japan, vol. 112, Jan. 23, 2004, pp. 61-64.
Sakka, S., "3.1. Kogaku Sekkei to Kogaku Glass" Glass Handbook, 1st edition, Sep. 30, 1975, pp. 71 to 73.
International Search Report issued Oct. 3, 2017 in corresponding International Application No. PCT/JP2017/026520.
Notice of Reasons for Refusal dated Jan. 12, 2021, in corresponding Japanese Patent Application No. 2018-535535.
Chinese Office Action dated Feb. 24, 2021, in corresponding Chinese Patent Application No. 201780049727.0.
Extended European Search Report dated Mar. 17, 2020 in European Patent Application No. 17843283.7 (6 pages).
O.V. Mazurin, et al., "Handbook of glass data Part D ternary non-silicate glasses", 1991, pp. 396 to 401.
Office Action, dated Jun. 25, 2021, in corresponding Japanese Application No. 2018-535535 (6 pp.).

(Continued)

*Primary Examiner* — Elizabeth A. Bolden

(57) ABSTRACT

Provided is optical glass containing, in terms of mol % of cations: 10 to 60% of a $La^{3+}$ component; more than 0% and up to 75% of a $Ga^{3+}$ component; and 5 to 75% of a $Nb^{5+}$ component, in which a total amount of the $La^{3+}$ component, $Ga^{3+}$ component, and $Nb^{5+}$ component is 60 to 100%.

22 Claims, 4 Drawing Sheets

(56) References Cited

OTHER PUBLICATIONS

Notice of Allowance, dated Mar. 31, 2021, in U.S. Appl. No. 16/283,349.
Notice of Allowance, dated Sep. 29, 2021, in U.S. Appl. No. 16/283,349.
U.S. Appl. No. 16/283,349, filed Feb. 22, 2019, Hiroyuki Inoue et al., The University of Tokyo and Nikon Corporation.
Japanese Office Action dated Aug. 1, 2023 for Japanese Application No. 2022-063843.
Chinese Office Action dated Jun. 16, 2023 for Chinese Application No. 202210393403.1.

\* cited by examiner

OPTICAL GLASS, OPTICAL ELEMENT INCLUDING OPTICAL GLASS, AND OPTICAL APPARATUS

CROSS-REFERENCE TO RELATED APPLICATIONS

This application is a continuation of U.S. application Ser. No. 16/283,349 filed Feb. 22, 2019, which is a continuation of International Application No. PCT/JP2017/26520 filed Jul. 21, 2017, which claims foreign priority benefit to Japanese Patent Application No. 2016-165366, filed Aug. 26, 2016, the disclosures of which are herein incorporated by reference in their entirety.

BACKGROUND

Technical Field

The present invention relates to optical glass, an optical element including the optical glass, and an optical apparatus. The present invention claims the priority of Japanese Patent Application No. 2016-165366 filed Aug. 26, 2016, and for designated countries where incorporation by reference of the literature is permitted, the matters described in the application is incorporated herein by reference.

Related Art

Optical glass is used in various kinds of optical elements and optical apparatuses, and for example, JP 07-081973 A discloses halide glass used in a light range from an ultraviolet region to an infrared region. Incidentally, development of optical glass having a high refractive index is required to widen a degree of freedom in design of an optical system used for an optical apparatus. However, when composition is adjusted so as to increase a refractive index of the optical glass, vitrification is likely to be difficult.

SUMMARY

In a first aspect of the present invention, provided is optical glass containing, in terms of mol % of cations: 10 to 60% of a $La^{3+}$ component; more than 0% and up to 75% of a $Ga^{3+}$ component; and 5 to 75% of a $Nb^{5+}$ component, in which a total amount of the $La^{3+}$ component, $Ga^{3+}$ component, and $Nb^{5+}$ component is 60 to 100%.

In a second aspect of the present invention, provided is an optical element including the optical glass of the first aspect.

In a third aspect of the present invention, provided is an optical apparatus including the optical element of the second aspect.

DETAILED DESCRIPTION

Figure 1:
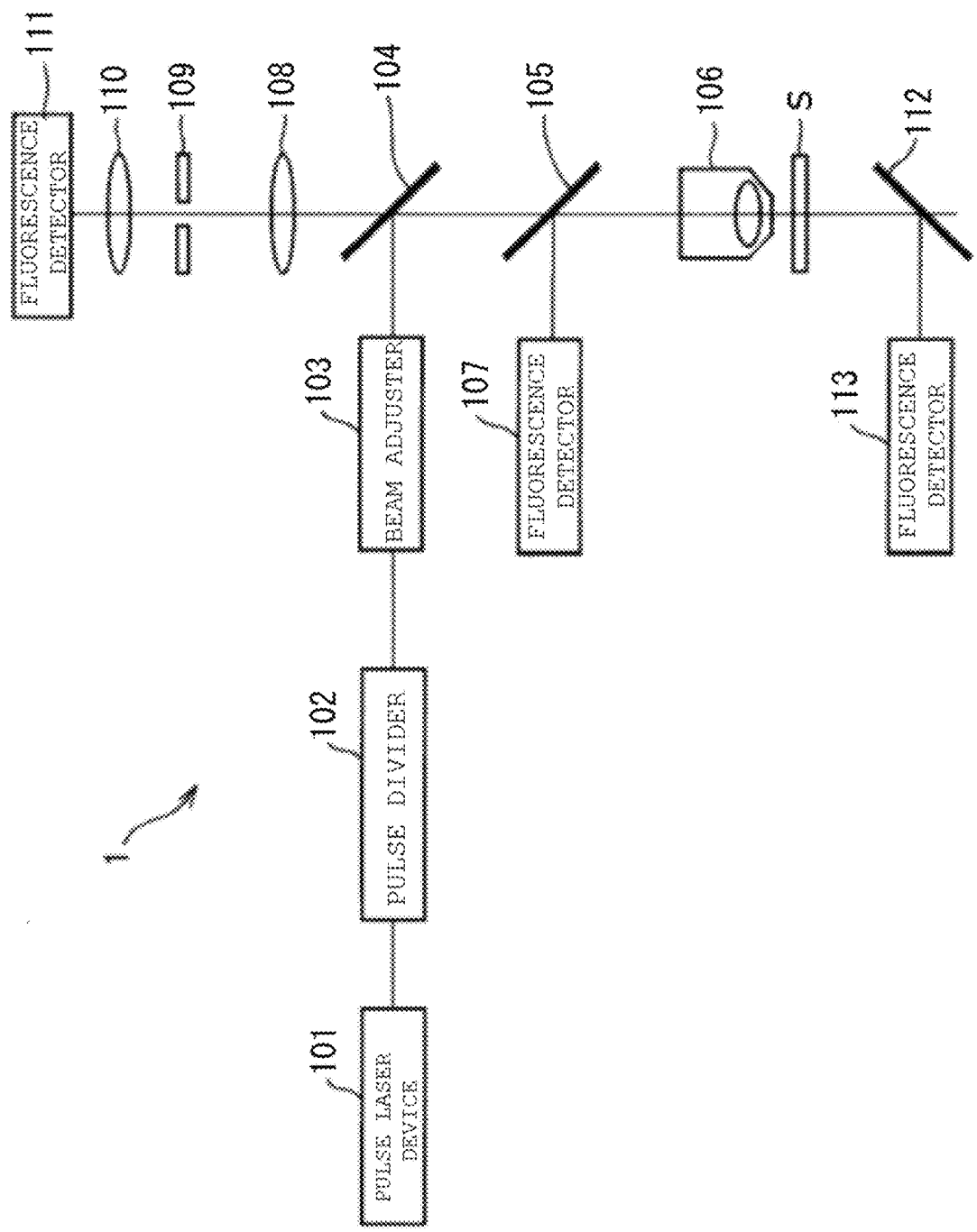
FIG. 1 is a block diagram showing an exemplary configuration of a multi-photon microscope including an optical element using optical glass according to an embodiment of the present invention.

An embodiment of the present invention (hereinafter referred to as "the present embodiment") will be described below. The present embodiment described below is an example to describe the present invention and is not intended to limit the present invention to the following matters.

A range of composition and a range of characteristics of each of components of optical glass in the present embodiment are as described below. Note that, in the present specification, the content of every one of components is indicated in terms of mol % of cations unless otherwise particularly specified.

<Optical Glass>

In the optical glass according to the present embodiment, following relations are satisfied in terms of mol % of cations: a $La^{3+}$ component is 10 to 60%; a $Ga^{3+}$ component is more than 0% and up to 75%; a $Nb^{5+}$ component is 5 to 75%; and a total amount of the $La^{3+}$ component, $Ga^{3+}$ component, and $Nb^{5+}$ component is 60 to 100%. A form of each of the cations is not particularly limited, but each of the cations is contained in the optical glass in a form of, for example, an oxide described later. As far as these relations are satisfied, the content of $Nb^{5+}$ may be 0%. The optical glass according to the present embodiment is novel optical glass that can be vitrified even when the content of cations constituting a network-forming oxide such as $SiO_2$ or $B_2O_3$ is low. Furthermore, optical glass having a high refractive index and a broad transmission band for a light range from ultraviolet to mid-infrared can be obtained. Generally, the optical glass can hardly achieve both a high refractive index and transmissivity for the light range from the ultraviolet region to a visible region, and both of them tend to have a trade-off relation. From this fact, it is difficult to obtain optical glass having a high refractive index and being colorless and transparent in the visible region. However, in the optical glass according to the present embodiment, these characteristics can also be provided by having the above-described composition of the components.

$La^{3+}$ is an essential component in the optical glass according to the present embodiment and contained as $La_2O_3$ in terms of oxide composition. $La^{3+}$ is effective as a component to increase a refractive index and improve ultraviolet transmitting property and infrared transmissivity, however, the effect is not sufficient when the content is little. On the other hand, when the content of $La^{3+}$ exceeds 60%, the glass tends to be devitrified. Therefore, the content is 10 to 60%, preferably 30 to 60%, and more preferably 40 to 55%.

$Ga^{3+}$ is an essential component in the optical glass according to the present embodiment and contained as $Ga_2O_3$ in terms of oxide composition. $Ga^{3+}$ has an effect of improving the ultraviolet transmissivity and the infrared transmissivity, but the effect is not sufficient when the content is little. On the other hand, when $Ga^{3+}$ is excessively introduced, the refractive index is decreased. Therefore, the content is more than 0 and to 75% (more than 0% and up to 75% or less), preferably 10 to 70% (10% or more and 70% or less), and more preferably 20 to 60% (20% or more and 60% or less).

$Nb^{5+}$ is an optional component in the optical glass according to the present embodiment and contained as $Nb_2O_5$ in terms of oxide composition. $Nb^{5+}$ has a significant effect of increasing the refractive index of the glass, and stability of the glass can be further enhanced by introducing $Nb^{5+}$ as a glass component together with $La^{3+}$ and $Ga^{3+}$. On the other hand, when $Nb^{5+}$ is excessively introduced, the ultraviolet transmissivity is largely degraded. Therefore, the content is 0 to 75%, preferably 5 to 60%, and more preferably 10 to 50%.

Other components that can be contained in the optical glass according to the present embodiment include, for example, $Ti^{4+}$, $Zr^{4+}$, $Hf^{4+}$, $Ta^{5+}$, $W^{6+}$, $Al^{3+}$, $B^{3+}$, $Si^{4+}$, $Ge^{4+}$, $Zn^{2+}$, $Y^{3+}$, $Gd^{3+}$, $Lu^{3+}$, $Mg^{2+}$, $Ca^{2+}$, $Sr^{2+}$, and $Ba^{2+}$. A form of each of the cations is not particularly limited, but each of the cations is contained in the optical glass in a form of, for example, an oxide described later. Needless to mention, not only one kind but also two or more kinds of cations may be introduced. These optional components will be described below.

$Ti^{4+}$ is a component contained as $TiO_2$ in terms of oxide composition. $Ti^{4+}$ has an effect of increasing the refractive index of the glass, however; when the content is much, the ultraviolet transmissivity is largely degraded. Therefore, the content is preferably 0 to 30%, more preferably 0 to 20%, and still more preferably 0 to 10%.

$Zr^{4+}$ and $Hf^{4+}$ are components contained as $ZrO_2$ and $HfO_2$ respectively in terms of oxide composition. $Zr^{4+}$ and $Hf^{4+}$ do not largely degrade the ultraviolet transmissivity and have an effect of increasing the refractive index of the glass, however; when the content is much, the glass tends to be devitrified. Therefore, the content is preferably 0 to 30%, more preferably 5 to 25%, and still more preferably from 5 to 20%.

$Ta^{5+}$ is a component contained as $Ta_2O_5$ in terms of oxide composition. $Ta^{5+}$ has an effect of increasing the refractive index and improving the ultraviolet transmissivity and the infrared transmissivity, however; when $Ta^{5+}$ is excessively introduced, the glass is likely to be crystallized. Therefore, the content is preferably 0 to 30%, more preferably 5 to 25%, and still more preferably 10 to 20%.

$W^{6+}$ is a component contained as $WO_3$ in terms of oxide composition. $W^{6+}$ has an effect of increasing the refractive index, but is a component that degrades the ultraviolet transmissivity and infrared transmissivity of the glass. Therefore, the content is preferably 0 to 20%, more preferably 0 to 10%, and still more preferably 0 to 5%.

$Al^{3+}$ is a component contained as $Al_2O_3$ in terms of oxide composition. $Al^{3+}$ has an effect of stabilizing the glass and improving the ultraviolet transmissivity, however; when $Al^{3+}$ is excessively introduced, the refractive index is decreased. Therefore, the content is preferably 0 to 30%, more preferably 0 to 20%, and still more preferably 0 to 15%.

$B^{3+}$ is contained as $B_2O_3$ in terms of oxide composition and is a component constituting a network forming oxide. $B^{3+}$ has an effect of improving glass formability, however; since $B^{3+}$ is a component with high volatility, $B^{3+}$ tends to deteriorate quality of striae when $B^{3+}$ is excessively introduced. Also, $B^{3+}$ is component that degrades the infrared transmissivity. Therefore, the content is preferably 0 to 30%, more preferably 0 to 20%, and still more preferably 0 to 10%, and still furthermore preferably 0%. Even when the content of $B^{3+}$ constituting the network forming oxide is reduced to this extent, the optical glass according to the present embodiment can be vitrified and can provide an excellent physical property.

$Si^{4+}$ is contained as $SiO_2$ in terms of oxide composition and also is a component constituting a network forming oxide. $Si^{4+}$ has an effect of easily improving glass formability, however; $Si^{4+}$ largely decreases the refractive index and the infrared transmissivity. Therefore, the content is preferably 0 to 20%, more preferably 0 to 15%, still more preferably 0 to 10%, and still furthermore preferably 0%. Even when the content of $Si^{4+}$ constituting a network forming oxide is reduced to this extent, the optical glass according to the present embodiment can be vitrified and can provide an excellent physical property.

$Ge^{4+}$ is contained as $GeO_2$ in terms of oxide composition and is a component constituting a network forming oxide. $Ge^{4+}$ has an effect of easily improving glass formability, however; a raw material is expensive. Additionally, when $Ge^{4+}$ is excessively introduced, volatility is exhibited and the quality of striae of the glass is deteriorated. Therefore, the content is preferably 0 to 20%, more preferably 0 to 15%, still more preferably 0 to 10%, and still furthermore preferably 0%. Even when the content of $Ge^{4+}$ is reduced to this extent, the optical glass according to the present embodiment can be vitrified and can provide an excellent physical property.

$Zn^{2+}$ is a component contained as $ZnO$ in terms of oxide composition. $Zn^{2+}$ has an effect similar to the above-mentioned $Ln^{3+}$ component does, however; since the effect of increasing the refractive index is lower than of that of the $Ln^{3+}$ component, a high refractive index is impaired when $Zn^{2+}$ is excessively introduced. Also, when $Zn^{2+}$ is excessively introduced, volatility is exhibited and the quality of striae of the glass is deteriorated. Therefore, the content is preferably 0 to 20%, more preferably 0 to 15%, and still more preferably 0 to 10%.

Rare earth $Ln^{3+}$ (representing one or more of Ln=Y, Gd, and Lu) is a component contained as $Ln_2O_3$ in terms of oxide composition. Similar to $La^{3+}$, $Ln^{3+}$ has an effect of increasing the refractive index and improving the ultraviolet transmissivity and the infrared transmissivity, however; when $Ln^{3+}$ is excessively introduced, the glass tends to be devitrified. Therefore, a total amount of the $Ln^{3+}$ component is preferably 0 to 30%, more preferably 0 to 25%, and still more preferably 0 to 20%.

An alkaline earth metal oxide $R^{2+}$ (representing one or more of R=Mg, Ca, Sr, and Ba) is a component contained as RO in terms of oxide composition. $R^{2+}$ has an effect similar to the above-described $Ln^{3+}$ component, however; since the effect of increasing the refractive index is lower than that of the $Ln^{3+}$ component, the property of high refractive index is impaired when $R^{2+}$ is excessively introduced. Therefore, a total amount of the $R^{2+}$ component is preferably 0 to 20%, more preferably 0 to 15%, and still more preferably 0 to 10%.

In the optical glass according to the present embodiment, the total amount of the $La^{3+}$ component, $Ga^{3+}$ component, and $Nb^{5+}$ component satisfies a relation of 60 to 100%. The total amount of the $La^{3+}$ component, $Ga^{3+}$ component, and $Nb^{5+}$ component is preferably 80 to 100%, more preferably 90 to 100%, and still more preferably 95 to 100%. When the above-described conditions are satisfied, it is possible to improve the transmissivity for the light from ultraviolet to infrared, the refractive index, and economic efficiency of the optical glass.

In the optical glass according to the present embodiment, a preferable combination of the above optional components preferably satisfies following respective relations in terms of mol % of cations: the $B^{3+}$ component is 0 to 30%, $Si^{4+}$ component is 0 to 20%, the $Ge^{4+}$ component is 0 to 20%; and a total amount of the $B^{3+}$ component, $Si^{4+}$ component, and $Ge^{4+}$ component is 0 to 30%.

Furthermore, in the optical glass according to the present embodiment, the total amount of the $B^{3+}$ component, $Si^{4+}$ component, and $Ge^{4+}$ component may also be 0%. In other words, $B^{3+}$, $Si^{4+}$ and $Ge^{4+}$ may not be substantially contained. The optical glass according to the present embodiment can be vitrified without containing these components constituting the network forming oxides. Additionally, since $Ge^{4+}$ is especially the expensive component, economic efficiency can be improved by not substantially containing $B^{3+}$, $Si^{4+}$ and $Ge^{4+}$.

In the optical glass according to the present embodiment, a preferable combination of the above optional components satisfies following respective relations in terms of mol % of cations: the $Ti^{4+}$ component is 0 to 30%, the $Zr^{4+}$ component is 0 to 20%, the $Hf^{4+}$ component is 0 to 20%, the $Ta^{5+}$ component is 0 to 30%, the $W^{6+}$ component is 0 to 20%, the $Al^{3o}$ component is 0 to 30%, the $B^{3+}$ component is 0 to 30%, the $Si^{4+}$ component is 0 to 20%, the $Ge^{4+}$ component is 0 to 20%, the $Zn^{2+}$ component is 0 to 20%, a total amount of the $Ln^{3+}$ component (representing one or more of Ln=Y, Gd, and Lu) is 0 to 30%, and a total amount of $R^{2+}$ component (representing one or more of R=Mg, Ca, Sr, and Ba) is 0 to 20%. A form of each of the cations is not particularly limited, but each of the cations is contained in the optical glass in a form of, for example, an oxide. The transmissivity and the refractive index of the optical glass are further improved by having the combination in the above-described composition of the components.

Not limited to the above-described components, other optional components may also be further added within a range not affecting achievement of the object of the optical glass according to the present embodiment.

Next, physical property values of the optical glass of the present embodiment will be described.

The optical glass according to the present embodiment relates to the optical glass with a high refractive index region. A refractive index ($n_d$) of the optical glass of the present embodiment in a d-line (wavelength: 587.562 nm) is preferably 1.85 to 2.25, more preferably 1.88 to 2.25, and still more preferably 1.92 to 2.25.

Furthermore, the optical glass according to the present embodiment is glass with low dispersion (a high Abbe number ($v_d$)). The Abbe number ($v_d$) of the optical glass according to the present embodiment is preferably 19 to 37, more preferably 25 to 36, and still more preferably 30 to 35.

To achieve wide utility for the light from the ultraviolet to the mid-infrared, it is desirable that: an ultraviolet absorption edge wavelength of the glass be on a short wavelength side as much as possible; and an infrared absorption edge wavelength be on a long wavelength side as much as possible. In this respect, the optical glass according to the present embodiment can preferably have a wavelength ($UV\lambda_5$) of 370 nm or less, more preferably 330 nm or less, and still more preferably 300 nm or less as a wavelength at which an ultraviolet transmissivity value including a surface reflection loss becomes 5% under the condition of a thickness of 1 mm. Furthermore, it is possible to have a wavelength ($IR\lambda_5$) of 6 μm or more, more preferably 6.5 μm or more, and still more preferably 7 μm or more as a wavelength at which an infrared transmissivity value including a surface reflection loss becomes 5% under the condition of a thickness of 1 mm. Note that the absorption edge wavelengths described in the present specification represent the above-described $UV\lambda_5$ and $IR\lambda_5$.

The optical glass according to the present embodiment is the glass with a high refractive index, which exhibits excellent transmissivity for the light range from the ultraviolet region to the infrared region. For example, in an optical system using the above-described optical glass in combination with another optical glass, it is possible to widen a degree of freedom in optical design more than that in the related art.

The optical glass according to the present embodiment is preferable as an optical element like a lens included in an optical apparatus such as a camera or a microscope. As the optical apparatus, a multi-photon microscope is particularly preferable.

<Multi-Photon Microscope>

FIG. 1 is a block diagram showing an exemplary configuration of a multi-photon microscope 1 that is an embodiment of the present invention. The multi-photon microscope 1 includes, as optical elements, an objective lens 106, a condenser lens 108, and an image-forming lens 110. An optical system of the multi-photon microscope 1 will be mainly described below.

A pulse laser apparatus 101 emits, for example, ultrashort pulse light with a near infrared wavelength (about 1000 nm) and a pulse width of femtoseconds (e.g., 100 femtoseconds). The ultrashort pulse light immediately after being emitted from the pulse laser apparatus 101 is generally linearly-polarized light polarized in a predetermined direction.

A pulse divider 102 divides the ultrashort pulse light and emits the ultrashort pulse light while increasing a repetition frequency thereof.

A beam adjuster 103 has: a function to adjust a beam diameter of the ultrashort pulse light incident from the pulse divider 102 in accordance with a pupil diameter of the objective lens 106; a function to condense the ultrashort pulse light and adjust a divergence angle of the ultrashort pulse light in order to correct an axial chromatic aberration (focus difference) between a wavelength of multi-photon excitation light emitted from a specimen S and a wavelength of the ultrashort pulse light; and a pre-chirp function (group velocity dispersion compensation function) to impart reverse group velocity dispersion to the ultrashort pulse light in order to correct a pulse width of the ultrashort pulse light from being widened due to group velocity dispersion while the ultrashort pulse light passes through the optical system.

The repetition frequency of the ultrashort pulse light emitted from the pulse laser apparatus 101 is increased by the pulse divider 102, and the above-described adjustment is performed by the beam adjuster 103. Then, the ultrashort pulse light emitted from the beam adjuster 103 is reflected by a dichroic mirror 104 in a direction to a dichroic mirror 105, passes through the dichroic mirror 105, is condensed by the objective lens 106, and emitted to the specimen S. At this point, an observation surface of the specimen S may be scanned with the ultrashort pulse light by using a scanning unit (not shown).

For example, when the specimen S is observed with fluorescence, fluorescent pigment with which the specimen S is colored is subjected to multi-photon excitation in a region of the specimen S irradiated with the ultrashort pulse light as well as in the vicinity of this region, and fluorescence having a wavelength shorter than that of the ultrashort pulse light, namely, the infrared wavelength is emitted (hereinafter referred to as "observation light").

The observation light emitted from the specimen S in the direction of the objective lens 106 is collimated by the objective lens 106, and then reflected by the dichroic mirror 105 or passes through the dichroic mirror 105 depending on the wavelength of the observation light.

The observation light reflected by the dichroic mirror 105 is incident on a fluorescence detector 107. The fluorescence detector 107 includes, for example, a barrier filter, a photo multiplier tube (PMT), and the like, receives the observation light reflected by the dichroic mirror 105, and outputs an electric signal corresponding to a light amount thereof. Furthermore, the fluorescence detector 107 detects the observation light over the observation surface of the specimen S when the observation surface of the specimen S is scanned with the ultrashort pulse light.

On the other hand, descanning is performed by the scanning unit (not shown) for the observation light that has passed through the dichroic mirror 105, and the observation light passes through the dichroic mirror 104, is collected by the condenser lens 108, passes through a pinhole 109 provided at a position substantially conjugate to a focal position of the objective lens 106, passes through the image-forming lens 110, and is incident on a fluorescence detector 111. The fluorescence detector 111 includes, for example, a barrier filter, a PMT, and the like, receives the observation light imaged by the image-forming lens 110 on a light receiving surface of the fluorescence detector 111, and outputs an electric signal corresponding to a light amount thereof. Furthermore, the fluorescence detector 111 detects the observation light over the observation surface of the specimen S when the observation surface of the specimen S is scanned with the ultrashort pulse light.

Meanwhile, all of the observation light emitted from the specimen S in the direction of the objective lens 106 may be detected by the fluorescence detector 111 by removing the dichroic mirror 105 from an optical path.

Also, the observation light emitted from the specimen S in a direction opposite to the objective lens 106 is reflected by a dichroic mirror 112 and incident on a fluorescence detector 113. The fluorescence detector 113 includes, for example, a barrier filter, a PMT, and the like, receives the observation light reflected by the dichroic mirror 112, and outputs an electric signal corresponding to a light amount thereof. Furthermore, the fluorescence detector 113 detects the observation light over the observation surface of the specimen S when the observation surface of the specimen S is scanned with the ultrashort pulse light.

The electric signals output from the fluorescence detectors 107, 111 and 113 respectively are received in, for example, a computer (not shown), and the computer can generate an observation image on the basis of the received electric signals, display the generated observation image, and store data of the observation image.

<Imaging Apparatus>

Figure 2:
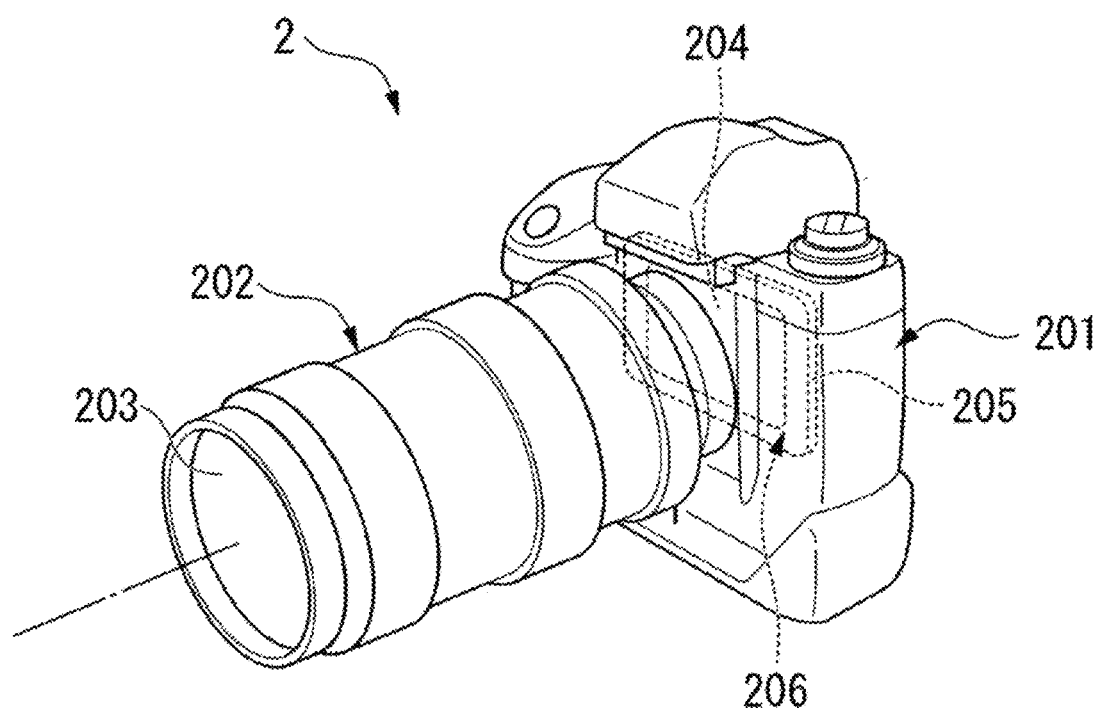
FIG. 2 is a perspective view of an imaging apparatus including an optical element using optical glass according to an embodiment of the present invention.

An optical element using the optical glass according to the present embodiment can also be used in an imaging apparatus. FIG. 2 is a perspective view of an imaging apparatus including an optical element using the optical glass according to an embodiment of the present invention. The imaging apparatus 2 (optical apparatus) includes a lens 203 (optical element) in which the optical glass according to the present embodiment is adopted as a base material.

The imaging apparatus 2 is a so-called digital single-lens reflex camera, and a lens barrel 202 is detachably attached to a lens mount (not shown) of a camera body 201. Light having passed through a lens 203 of the lens barrel 202 is formed as an image on a sensor chip (solid-state imaging element) 204 of a multi-chip module 206 arranged on a rear side of the camera body 201. This sensor chip 204 is a bare chip such as a so-called CMOS image sensor. The multi-chip module 206 is, for example, a chip on glass (COG) type module in which the sensor chip 204 is mounted on a glass substrate 205 in a bare chip state.

Note that the optical apparatus is not limited to such an imaging apparatus and includes a variety of apparatuses like a projector. The optical element is also not limited to a lens and includes, for example, a variety of elements such as a prism.

<Manufacturing Method for Optical Glass>

The optical glass of the present embodiment can be manufactured by using, for example, a levitation furnace. As the levitation furnace, there are: an electrostatic type; an electromagnetic type; a sonic type; a magnetic type; a gas-jet type; and the like, and the type is not particularly limited, however; it is preferable to use a gas-jet levitation furnace for levitation melting of an oxide. A manufacturing method using the gas-jet levitation furnace will be described below as an example.

Figure 3A:
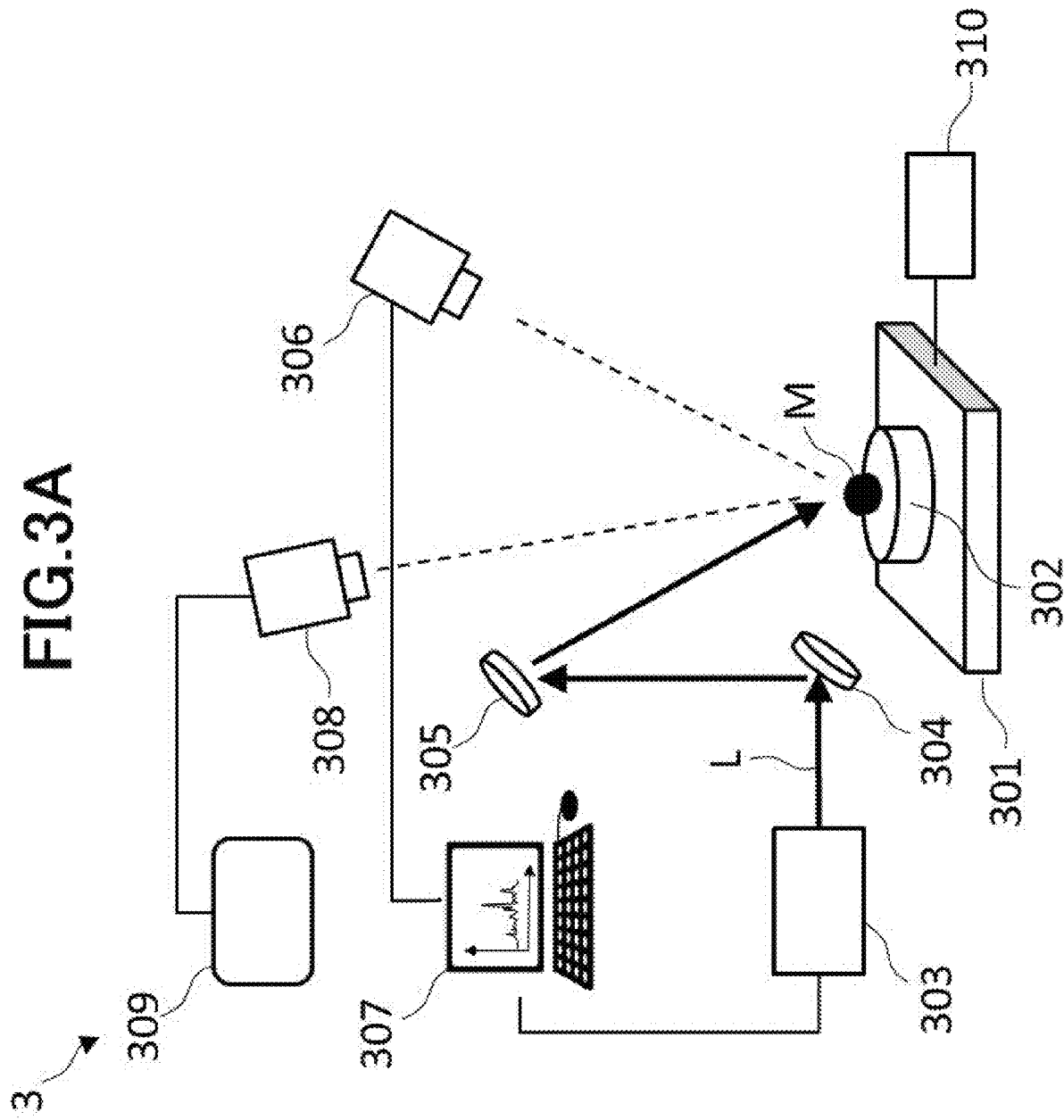
FIG. 3A is a diagram showing a schematic view of an entire structure of a gas-jet levitation furnace.
Figure 3B:
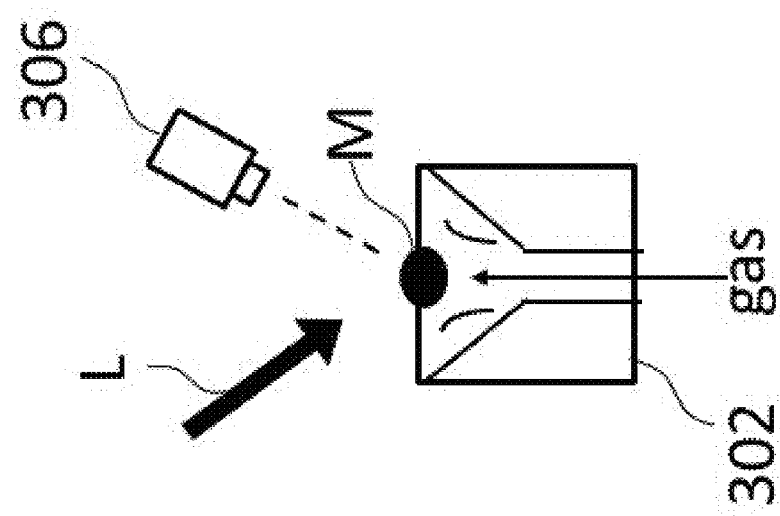
FIG. 3B is an enlarged schematic view of a base on a stage of the gas-jet levitation furnace.

FIGS. 3A and 3B show schematic views of a gas-jet levitation furnace. In the drawings, FIG. 3A is the schematic view of an entire structure of the levitation furnace, and FIG. 3B is the enlarged schematic view of a base on a stage of the gas-jet levitation furnace. In the gas-jet levitation furnace 3, a raw material M is placed on a base 302 on a stage 301. Then, the raw material M is irradiated with laser light L emitted from a laser light source 303 via a mirror 304 and a mirror 305. A temperature of the raw material M heated by the irradiation with the laser light L is monitored by a radiation thermometer 306. Output of the laser light source 303 is controlled by a computer 307 on the basis of temperature information of the raw material M monitored by the radiation thermometer 306. Furthermore, a state of the raw material M is imaged by a CCD camera 308 and output to a monitor 309 (see FIG. 3A). Note that a carbon dioxide laser can be used as the laser light source, for example.

In the gas-jet levitation furnace 3, the raw material M is in a state of being levitated by a gas fed into the base (see FIG. 3B). A flow rate of the gas fed into the base is controlled by a gas flow rate regulator 310. For example, the gas can be jetted from a nozzle provided with a conical hole, and non-contact heating can be performed by a laser beam L in a state where the raw material M is levitated. When the raw material M is melted, a shape of the material becomes spherical or ellipsoidal due to own surface tension and is levitated in this state. After that, when the laser beam L is intercepted, the raw material that has become a state of a melt is cooled, and a transparent glass is obtained. Note that a kind of the gas is not particularly limited, and a known gas can be appropriately adopted, and oxygen, nitrogen, carbon dioxide, argon, air, or the like can be exemplified. Additionally, a shape of the nozzle and the heating method are not particularly limited, and a known method can be appropriately adopted.

Conventionally, a $La^{3+}$—$Ga^{3+}$ system that is basic composition of the optical glass according to the present embodiment is hardly vitrified. For example, in a case of manufacturing optical glass by using a container such as a crucible that is normally used, it is necessary to improve glass formability by containing a large amount of network forming oxides such as $SiO_2$, $B_2O_3$, $P_2O_5$, and $GeO_2$ In a case of the composition having little content of the network forming oxides with low glass formability, crystallization starts from an interface between the container and the melt (heterogeneous nucleation) and vitrification is difficult in most cases.

On the other hand, in a case of manufacturing the optical glass by the above-described method using the levitation furnace, there is no contact between the container and the melt, and therefore, heterogeneous nucleation can be suppressed to a maximum extent. As a result, vitrification of the melt can be greatly promoted and vitrification can be achieved even in a case of having the composition with which manufacturing by the crucible melting is impossible and in which little content of network forming oxides is contained or no network forming oxide is contained. With adoption of the above-described manufacturing method, it is possible to manufacture the optical glass of the $La^{3+}$—$Ga^{3+}$ system that cannot be vitrified in the related art. The optical glass according to the present embodiment has a high $n_d$, a high Abbe number, and high optical transmitting property for the light in a broad band approximately from 270 nm to 10 μm. Therefore, the optical glass is applicable as a glass material with a high refractive index and low dispersion or a material with broad band light transmission. Furthermore, since a third component such as $Nb^{5+}$ is combined with the two-component $La^{3+}$—$Ga^{3+}$ system, a region of a higher refractive index can also be covered without seriously impairing transmissivity of the above-described component system for the broad light region (however, the action and effect of the present embodiment are not limited thereto).

EXAMPLES

The present invention will be described more in detail using following Examples and Comparative Examples, but the present invention is not limited by the following Examples.
(Preparation of Optical Glass)
Optical glass was prepared in accordance with following procedures by using the gas-jet levitation furnace 3 shown in FIGS. 3A and 3B. First, raw materials selected from oxides, hydroxides, carbonates, nitrates, sulfates, and the like were weighed so as to obtain predetermined chemical composition, and then mixed in an alumina mortar. The mixed raw material was uniaxially pressurized at 20 MPa and shaped into cylindrical pellets. The obtained pellets were fired in the air by an electric furnace at 1000 to 1300° C. for 6 to 12 hours to prepare a sintered body. The obtained sintered body was coarsely crushed, and several tens of milligrams thereof were sampled and set at the nozzle of the base. Then, the raw material was melted by emitting carbonic dioxide laser beams from above while injecting an oxygen gas. The melted raw material came to have a spherical or ellipsoidal shape due to own surface tension, and was brought into a levitated state by pressure of the gas. The raw material was cooled by intercepting output of the laser beams in a state where the raw material was completely melted, and then the glass was obtained. Note that a transparent glass sphere having a diameter of 2 to 3 mm was obtained in each of Examples. Additionally, in the glass of each of Examples, volatilization that could be visually recognized was not observed during melting, and the glass was obtained without bubbles and devitrification.
(Measurement of Transmissivity for Ultraviolet to Visible Light)
An UV-Visible/NIR Spectrophotometer ("UH4150" manufactured by Hitachi High-Technologies Corporation) was used to measure transmissivity for the light in the range from the ultraviolet region to the visible region. Two surfaces of the glass sphere were polished so as to form flat parallel faces with a thickness of 1 mm, and the processed specimen was fixed at an aperture provided with a hole of a diameter of 2.0 mm, and transmissivity was measured for the light in the range from 250 to 700 nm.
(Measurement of Infrared Transmissivity)
A Fourier transform infrared (FT-IR) spectrophotometer ("NICOLET 6700" manufactured by Thermo Fisher) was used to measure infrared transmissivity. Similar to measurement of transmissivity for ultraviolet to visible light, the transmissivity was measured in a range from 400 to 4000 $cm^{-1}$ by using an aperture with a diameter of 2.0 mm.
(Measurement of Refractive Index)
A refractive index of the glass was measured by using a prism coupler (model "2010/M" manufactured by Metricon). The polished faces of the specimen used in the above-described transmissivity measurement was brought into tight contact with a single crystal rutile prism, and a refractive index was acquired by measuring a total reflection angle when light having a measurement wavelength was incident. Measurement was executed five times at three wavelengths of 473 nm, 594.1 nm, and 656 nm, and an average value was adopted as a measured value. Additionally, for the provided measured value, fitting was performed by a least-square method using a Drude-Voigt dispersion equation shown below to calculate a refractive index and an Abbe number $(v_d)$ in each of a d-line (587.562 nm), an F-line (486.133 nm), and a C-line (656.273 nm).

$$\frac{1}{n^2-1} = \frac{\pi m c^2}{e^2 N f}\left(\frac{1}{\lambda_0^2} - \frac{1}{\lambda^2}\right) \qquad \text{[Equation 1]}$$

n: refractive index, m: electron mass, c: light velocity, e: elementary charge, N: number of molecules per unit volume, f: oscillator strength, $\lambda_0$: natural resonance wavelength, $\lambda$: wavelength Additionally, the Abbe number $(v_d)$ is defined by an Equation below.

$$v_d = \frac{n_d - 1}{n_F - n_C} \qquad \text{[Equation 2]}$$

As for optical glass in each of Examples and each of Comparative Examples, composition of the components (mol % basis), a specimen thickness, an ultraviolet absorption edge wavelength $(UV\lambda_5)$, an infrared absorption edge wavelength $(IR\lambda_5)$, a refractive index $(n_d)$, and an Abbe number $(v_d)$ are shown respectively in each of Tables.

TABLE 1

|  | EXAMPLE 1 | EXAMPLE 2 | EXAMPLE 3 | EXAMPLE 4 | EXAMPLE 5 |
|---|---|---|---|---|---|
| $La^{3+}$ | 55 | 50 | 45 | 40 | 35 |
| $Ga^{2+}$ | 45 | 50 | 55 | 60 | 65 |
| $Nb^{5+}$ | | | | | |
| $B^{3+}$ | | | | | |
| $Si^{4+}$ | | | | | |
| $Ge^{4+}$ | | | | | |
| $Al^{3+}$ | | | | | |
| $Ti^{4+}$ | | | | | |
| $Zr^{4+}$ | | | | | |
| $Hf^{4+}$ | | | | | |
| $Ta^{5+}$ | | | | | |
| $W^{6+}$ | | | | | |

TABLE 1-continued

|  |  |  |  |  |  |
|---|---|---|---|---|---|
| $Y^{3+}$ | | | | | |
| $Gd^{3+}$ | | | | | |
| $Lu^{3+}$ | | | | | |
| $Mg^{2+}$ | | | | | |
| $Ca^{2+}$ | | | | | |
| $Sr^{2+}$ | | | | | |
| $Ba^{2+}$ | | | | | |
| $Zn^{2+}$ | | | | | |
| Total | 100 | 100 | 100 | 100 | 100 |
| VITRIFICATION | ○ | ○ | ○ | ○ | ○ |
| UV $\lambda_5$(nm) | 274 | 281 | 277 | 278 | 282 |
| IR $\lambda_5$(μm) | 8.38 | 7.58 | 8.05 | 7.97 | 7.90 |
| $n_d$ | 1.96183 | 1.95368 | 1.84808 | 1.94771 | 1.93512 |
| $\nu_d$ | 34.3 | 33.6 | 34.0 | 34.7 | 33.6 |

|  | EXAMPLE 6 | EXAMPLE 7 | EXAMPLE 8 | EXAMPLE 9 | EXAMPLE 10 |
|---|---|---|---|---|---|
| $La^{3+}$ | 30 | 25 | 60 | 60 | 55 |
| $Ga^{2+}$ | 70 | 75 | 15 | 10 | 40 |
| $Nb^{5+}$ | | | 25 | 30 | 5 |
| $B^{3+}$ | | | | | |
| $Si^{4+}$ | | | | | |
| $Ge^{4+}$ | | | | | |
| $Al^{3+}$ | | | | | |
| $Ti^{4+}$ | | | | | |
| $Zr^{4+}$ | | | | | |
| $Hf^{4+}$ | | | | | |
| $Ta^{5+}$ | | | | | |
| $W^{6+}$ | | | | | |
| $Y^{3+}$ | | | | | |
| $Gd^{3+}$ | | | | | |
| $Lu^{3+}$ | | | | | |
| $Mg^{2+}$ | | | | | |
| $Ca^{2+}$ | | | | | |
| $Sr^{2+}$ | | | | | |
| $Ba^{2+}$ | | | | | |
| $Zn^{2+}$ | | | | | |
| Total | 100 | 100 | 100 | 100 | 100 |
| VITRIFICATION | ○ | ○ | ○ | ○ | ○ |
| UV $\lambda_5$(nm) | 286 | 289 | 316 | 322 | 301 |
| IR $\lambda_5$(μm) | 7.65 | 7.69 | 7.44 | 7.08 | 7.76 |
| $n_d$ | 1.95851 | 1.92181 | 2.10192 | 2.12566 | 1.99055 |
| $\nu_d$ | 33.6 | 34.6 | 27.6 | 27.0 | 32.2 |

TABLE 2

|  | EXAMPLE 11 | EXAMPLE 12 | EXAMPLE 13 | EXAMPLE 14 | EXAMPLE 15 |
|---|---|---|---|---|---|
| $La^{3+}$ | 55 | 55 | 55 | 55 | 50 |
| $Ga^{3+}$ | 35 | 30 | 25 | 20 | 40 |
| $Nb^{5+}$ | 10 | 15 | 20 | 25 | 10 |
| $B^{3+}$ | | | | | |
| $Si^{4+}$ | | | | | |
| $Ge^{4+}$ | | | | | |
| $Al^{3+}$ | | | | | |
| $Ti^{4+}$ | | | | | |
| $Zr^{4+}$ | | | | | |
| $Hf^{4+}$ | | | | | |
| $Ta^{5+}$ | | | | | |
| $W^{6+}$ | | | | | |
| $Y^{3+}$ | | | | | |
| $Gd^{3+}$ | | | | | |
| $Lu^{3+}$ | | | | | |
| $Mg^{2+}$ | | | | | |
| $Ca^{2+}$ | | | | | |
| $Sr^{2+}$ | | | | | |
| $Ba^{2+}$ | | | | | |
| $Zn^{2+}$ | | | | | |
| Total | 100 | 100 | 100 | 100 | 100 |
| VITRIFICATION | ○ | ○ | ○ | ○ | ○ |
| UV $\lambda_5$(nm) | 306 | 310 | 314 | 317 | 307 |

TABLE 2-continued

|  |  |  |  |  |  |
|---|---|---|---|---|---|
| IR $\lambda_5$(μm) | 7.64 | 7.56 | 7.46 | 7.34 | 7.48 |
| $n_d$ | 2.01952 | 2.04528 | 2.07086 | 2.09497 | 2.01905 |
| $v_d$ | 31.1 | 29.5 | 28.8 | 27.9 | 30.7 |

|  | EXAMPLE 16 | EXAMPLE 17 | EXAMPLE 18 | EXAMPLE 19 | EXAMPLE 20 |
|---|---|---|---|---|---|
| $La^{3+}$ | 50 | 50 | 40 | 40 | 40 |
| $Ga^{3+}$ | 30 | 20 | 50 | 40 | 30 |
| $Nb^{5+}$ | 20 | 30 | 10 | 20 | 30 |
| $B^{3+}$ | | | | | |
| $Si^{4+}$ | | | | | |
| $Go^{4+}$ | | | | | |
| $Al^{3+}$ | | | | | |
| $Ti^{4+}$ | | | | | |
| $Zr^{4+}$ | | | | | |
| $Hf^{4+}$ | | | | | |
| $Ta^{5+}$ | | | | | |
| $W^{6+}$ | | | | | |
| $Y^{3+}$ | | | | | |
| $Gd^{3+}$ | | | | | |
| $Lu^{3+}$ | | | | | |
| $Mg^{2+}$ | | | | | |
| $Ca^{2+}$ | | | | | |
| $Sr^{2+}$ | | | | | |
| $Ba^{2+}$ | | | | | |
| $Zn^{2+}$ | | | | | |
| Total | 100 | 100 | 100 | 100 | 100 |
| VITRIFICATION | ○ | ○ | ○ | ○ | ○ |
| UV $\lambda_5$(nm) | 314 | 323 | 307 | 317 | 326 |
| IR $\lambda_5$(μm) | 7.21 | 6.96 | 7.31 | 7.20 | 6.80 |
| $n_d$ | 2.06478 | 2.11349 | 2.00786 | 2.05451 | 2.10232 |
| $v_d$ | 28.7 | 27.2 | 30.8 | 28.7 | 26.9 |

TABLE 3

|  | EXAMPLE 21 | EXAMPLE 22 | EXAMPLE 23 | EXAMPLE 24 | EXAMPLE 25 |
|---|---|---|---|---|---|
| $La^{3+}$ | 40 | 40 | 30 | 30 | 30 |
| $Ga^{3+}$ | 20 | 10 | 60 | 50 | 40 |
| $Nb^{5+}$ | 40 | 50 | 10 | 20 | 30 |
| $B^{3+}$ | | | | | |
| $Si^{4+}$ | | | | | |
| $Go^{4+}$ | | | | | |
| $Al^{3+}$ | | | | | |
| $Ti^{4+}$ | | | | | |
| $Zr^{4+}$ | | | | | |
| $Hf^{4+}$ | | | | | |
| $Ta^{5+}$ | | | | | |
| $W^{6+}$ | | | | | |
| $Y^{3+}$ | | | | | |
| $Gd^{3+}$ | | | | | |
| $Lu^{3+}$ | | | | | |
| $Mg^{2+}$ | | | | | |
| $Ca^{2+}$ | | | | | |
| $Sr^{2+}$ | | | | | |
| $Ba^{2+}$ | | | | | |
| $Zn^{2+}$ | | | | | |
| Total | 100 | 100 | 100 | 100 | 100 |
| VITRIFICATION | ○ | ○ | ○ | ○ | ○ |
| UV $\lambda_5$(nm) | 332 | 342 | 304 | 315 | 324 |
| IR $\lambda_5$(μm) | 6.78 | 6.45 | 7.48 | 7.33 | 7.19 |
| $n_d$ | 2.14495 | 2.18276 | 1.98507 | 2.03847 | 2.09007 |
| $v_d$ | 25.2 | 23.8 | 30.7 | 28.6 | 26.4 |

|  | EXAMPLE 26 | EXAMPLE 27 | EXAMPLE 28 | EXAMPLE 29 | EXAMPLE 30 |
|---|---|---|---|---|---|
| $La^{3+}$ | 30 | 30 | 30 | 20 | 20 |
| $Ga^{3+}$ | 30 | 20 | io | 30 | 20 |
| $Nb^{5+}$ | 40 | 50 | 60 | 50 | 60 |
| $B^{3+}$ | | | | | |
| $Si^{4+}$ | | | | | |
| $Go^{4+}$ | | | | | |
| $Al^{3+}$ | | | | | |
| $Ti^{4+}$ | | | | | |
| $Zr^{4+}$ | | | | | |

TABLE 3-continued

|  |  |  |  |  |  |
|---|---|---|---|---|---|
| $Hf^{4+}$ | | | | | |
| $Ta^{5+}$ | | | | | |
| $W^{6+}$ | | | | | |
| $Y^{3+}$ | | | | | |
| $Gd^{3+}$ | | | | | |
| $Lu^{3+}$ | | | | | |
| $Mg^{2+}$ | | | | | |
| $Ca^{2+}$ | | | | | |
| $Sr^{2+}$ | | | | | |
| $Ba^{2+}$ | | | | | |
| $Zn^{2+}$ | | | | | |
| Total | 100 | 100 | 100 | 100 | 100 |
| VITRIFICATION | ○ | ○ | ○ | ○ | ○ |
| UV $\lambda_5$(nm) | 332 | 342 | 347 | 351 | 359 |
| IR $\lambda_5$(μm) | 7.04 | 6.45 | 6.78 | 6.70 | 6.61 |
| $n_d$ | 2.12886 | 2.16991 | 2.21373 | 2.15838 | 2.20384 |
| $v_d$ | 24.7 | 23.1 | 21.6 | 22.3 | 20.8 |

TABLE 4

|  | EXAMPLE 31 | EXAMPLE 32 | EXAMPLE 33 | EXAMPLE 34 | EXAMPLE 35 |
|---|---|---|---|---|---|
| $La^{3+}$ | 20 | 10 | 30 | 30 | 30 |
| $Ga^{3+}$ | 10 | 30 | 65 | 60 | 65 |
| $Nb^{5+}$ | 70 | 60 | | | |
| $B^{3+}$ | | | 5 | 10 | |
| $Si^{4+}$ | | | | | 5 |
| $Go^{4+}$ | | | | | |
| $Al^{3+}$ | | | | | |
| $Ti^{4+}$ | | | | | |
| $Zr^{4+}$ | | | | | |
| $Hf^{4+}$ | | | | | |
| $Ta^{5+}$ | | | | | |
| $W^{6+}$ | | | | | |
| $Y^{3+}$ | | | | | |
| $Gd^{3+}$ | | | | | |
| $Lu^{3+}$ | | | | | |
| $Mg^{2+}$ | | | | | |
| $Ca^{2+}$ | | | | | |
| $Sr^{2+}$ | | | | | |
| $Ba^{2+}$ | | | | | |
| $Zn^{2+}$ | | | | | |
| Total | 100 | 100 | 100 | 100 | 100 |
| VITRIFICATION | ○ | ○ | ○ | ○ | ○ |
| UV $\lambda_5$(nm) | 365 | 363 | 284 | 282 | 281 |
| IR $\lambda_5$(μm) | 6.54 | 6.63 | 6.90 | 6.47 | 7.38 |
| $n_d$ | 2.24826 | 2.18795 | 1.92761 | 1.91967 | 1.90537 |
| $v_d$ | 19.3 | 19.9 | 34.7 | 35.7 | 35.3 |

|  | EXAMPLE 36 | EXAMPLE 37 | EXAMPLE 38 | EXAMPLE 39 | EXAMPLE 40 |
|---|---|---|---|---|---|
| $La^{3+}$ | 30 | 30 | 30 | 55 | 30 |
| $Ga^{3+}$ | 60 | 65 | 60 | 35 | 60 |
| $Nb^{5+}$ | | | | | |
| $B^{3+}$ | | | | | |
| $Si^{4+}$ | 10 | | | | |
| $Go^{4+}$ | | 5 | 10 | | |
| $Al^{3+}$ | | | | 10 | |
| $Ti^{4+}$ | | | | | 10 |
| $Zr^{4+}$ | | | | | |
| $Hf^{4+}$ | | | | | |
| $Ta^{5+}$ | | | | | |
| $W^{6+}$ | | | | | |
| $Y^{3+}$ | | | | | |
| $Gd^{3+}$ | | | | | |
| $Lu^{3+}$ | | | | | |
| $Mg^{2+}$ | | | | | |
| $Ca^{2+}$ | | | | | |
| $Sr^{2+}$ | | | | | |
| $Ba^{2+}$ | | | | | |
| $Zn^{2+}$ | | | | | |
| Total | 100 | 100 | 100 | 100 | 100 |
| VITRIFICATION | ○ | ○ | ○ | ○ | ○ |
| UV $\lambda_5$(nm) | 279 | 286 | 286 | 272 | 328 |

TABLE 4-continued

| | | | | | |
|---|---|---|---|---|---|
| IR $\lambda_5$(μm) | 7.10 | 7.48 | 7.43 | 7.40 | 7.29 |
| $n_d$ | 1.88538 | 1.92858 | 1.93319 | 1.94163 | 1.98842 |
| $v_d$ | 36.9 | 34.3 | 34.0 | 34.7 | 30.3 |

TABLE 5

| | EXAMPLE 41 | EXAMPLE 42 | EXAMPLE 43 | EXAMPLE 44 | EXAMPLE 45 |
|---|---|---|---|---|---|
| $La^{3+}$ | 30 | 30 | 55 | 55 | 45 |
| $Ga^{2+}$ | 60 | 60 | 35 | 35 | 45 |
| $Nb^{5+}$ | | | | | |
| $B^{3+}$ | | | | | |
| $Si^{4+}$ | | | | | |
| $Ge^{4+}$ | | | | | |
| $Al^{3+}$ | | | | | |
| $Ti^{4+}$ | | | | | |
| $Zr^{4+}$ | 10 | | | | |
| $Hf^{4+}$ | | 10 | | | |
| $Ta^{5+}$ | | | 10 | | |
| $W^{6+}$ | | | | 10 | |
| $Y^{3+}$ | | | | | 10 |
| $Gd^{3+}$ | | | | | |
| $Lu^{3+}$ | | | | | |
| $Mg^{2+}$ | | | | | |
| $Ca^{2+}$ | | | | | |
| $Sr^{2+}$ | | | | | |
| $Ba^{2+}$ | | | | | |
| $Zn^{2+}$ | | | | | |
| Total | 100 | 100 | 100 | 100 | 100 |
| VITRIFICATION | ○ | ○ | ○ | ○ | ○ |
| UV $\lambda_5$(nm) | 278 | 279 | 270 | 350 | 276 |
| IR $\lambda_5$(μm) | 7.53 | 7.53 | 7.64 | 7.44 | 7.73 |
| $n_d$ | 1.96296 | 1.95337 | 2.00278 | 2.02560 | 1.95612 |
| $v_d$ | 33.6 | 34.9 | 32.7 | 28.9 | 34.0 |

| | EXAMPLE 46 | EXAMPLE 47 | EXAMPLE 48 | EXAMPLE 49 | EXAMPLE 50 |
|---|---|---|---|---|---|
| $La^{3+}$ | 45 | 45 | 50 | 45 | 45 |
| $Ga^{2+}$ | 45 | 45 | 45 | 45 | 45 |
| $Nb^{5+}$ | | | | | |
| $B^{3+}$ | | | | | |
| $Si^{4+}$ | | | | | |
| $Ge^{4+}$ | | | | | |
| $Al^{3+}$ | | | | | |
| $Ti^{4+}$ | | | | | |
| $Zr^{4+}$ | | | | | |
| $Hf^{4+}$ | | | | | |
| $Ta^{5+}$ | | | | | |
| $W^{6+}$ | | | | | |
| $Y^{3+}$ | | | | | |
| $Gd^{3+}$ | 10 | | | | |
| $Lu^{3+}$ | | 10 | | | |
| $Mg^{2+}$ | | | 5 | | |
| $Ca^{2+}$ | | | | 10 | |
| $Sr^{2+}$ | | | | | 10 |
| $Ba^{2+}$ | | | | | |
| $Zn^{2+}$ | | | | | |
| Total | 100 | 100 | 100 | 100 | 100 |
| VITRIFICATION | ○ | ○ | ○ | ○ | ○ |
| UV $\lambda_5$(nm) | 278 | 278 | 276 | 279 | 280 |
| IR $\lambda_5$(μm) | 7.73 | 7.71 | 7.83 | 7.66 | 7.68 |
| $n_d$ | 1.06209 | 1.95855 | 1.96226 | 1.92822 | 1.92655 |
| $v_d$ | 33.8 | 34.2 | 33.8 | 34.0 | 32.8 |

TABLE 6

| | EXAMPLE 51 | EXAMPLE 52 |
|---|---|---|
| $La^{3+}$ | 45 | 45 |
| $Ga^{3+}$ | 45 | 45 |
| $Nb^{5+}$ | | |
| $B^{3+}$ | | |
| $Si^{4+}$ | | |
| $Ge^{4+}$ | | |
| $Al^{3+}$ | | |
| $Ti^{4+}$ | | |
| $Zr^{4+}$ | | |
| $Hf^{4+}$ | | |

TABLE 6-continued

|  | EXAMPLE 51 | EXAMPLE 52 |
|---|---|---|
| $Ta^{5+}$ | | |
| $W^{6+}$ | | |
| $Y^{3+}$ | | |
| $Gd^{3+}$ | | |
| $Lu^{3+}$ | | |
| $Mg^{2+}$ | | |
| $Ca^{2+}$ | | |
| $Sr^{2+}$ | | |
| $Ba^{2+}$ | 10 | |
| $Zn^{2+}$ | | 10 |
| Total | 100 | 100 |
| VITRIFICATION | ○ | ○ |
| UV $\lambda_5$(nm) | 280 | 278 |
| IR $\lambda_5$(μm) | 7.72 | 7.65 |
| $n_d$ | 1.92758 | 1.95550 |
| $v_d$ | 33.3 | 34.7 |

COMPARATIVE EXAMPLES

Kinds of optical glass each having different composition of the components shown in each of Tables 7 to 9 were prepared by a method similar to Examples described above. However, crystallization was observed in a part or an entire part of each specimen, and it was impossible to obtain a specimen usable as optical glass.

TABLE 7

|  | COMP. EX. 1 | COMP. EX. 2 | COMP. EX. 3 | COMP. EX. 4 | COMP. EX. 5 | COMP. EX. 6 | COMP. EX. 7 | COMP. EX. 8 | COMP. EX. 9 | COMP. EX. 10 |
|---|---|---|---|---|---|---|---|---|---|---|
| $La^{3+}$ | 90 | 85 | 80 | 75 | 70 | 65 | 20 | 15 | 70 | 70 |
| $Ga^{2+}$ | 10 | 15 | 20 | 25 | 30 | 35 | 80 | 85 | 10 | 20 |
| $Nb^{5+}$ | | | | | | | | | 20 | 10 |
| $B^{3+}$ | | | | | | | | | | |
| $Si^{4+}$ | | | | | | | | | | |
| $Ge^{4+}$ | | | | | | | | | | |
| $Al^{3+}$ | | | | | | | | | | |
| $Ti^{4+}$ | | | | | | | | | | |
| $Zr^{4+}$ | | | | | | | | | | |
| $Hf^{4+}$ | | | | | | | | | | |
| $Ta^{5+}$ | | | | | | | | | | |
| $W^{6+}$ | | | | | | | | | | |
| $Y^{3+}$ | | | | | | | | | | |
| $Gd^{3+}$ | | | | | | | | | | |
| $Lu^{3+}$ | | | | | | | | | | |
| $Mg^{2+}$ | | | | | | | | | | |
| $Ca^{2+}$ | | | | | | | | | | |
| $Sr^{2+}$ | | | | | | | | | | |
| $Ba^{2+}$ | | | | | | | | | | |
| $Zn^{2+}$ | | | | | | | | | | |
| Total | 100 | 100 | 100 | 100 | 100 | 100 | 100 | 100 | 100 | 100 |
| VITRIFICATION | X | X | X | X | X | X | X | X | X | X |
| UV $\lambda_5$(nm) | | | | | | | | | | |
| IR $\lambda_5$(μm) | | | | | | | | | | |
| $n_d$ | | | | | | | | | | |
| $v_d$ | | | | | | | | | | |

TABLE 8

|  | COMP. EX. 11 | COMP. EX. 12 | COMP. EX. 13 | COMP. EX. 14 | COMP. EX. 15 | COMP. EX. 16 | COMP. EX. 17 | COMP. EX. 18 | COMP. EX. 19 | COMP. EX. 20 |
|---|---|---|---|---|---|---|---|---|---|---|
| $La^{3+}$ | 65 | 65 | 65 | 10 | 10 | | | | | |
| $Ga^{2+}$ | 5 | 10 | 15 | 10 | 80 | 20 | 25 | 30 | 35 | 40 |
| $Nb^{5+}$ | 30 | 25 | 20 | 80 | 10 | 80 | 75 | 70 | 65 | 60 |
| $B^{3+}$ | | | | | | | | | | |
| $Si^{4+}$ | | | | | | | | | | |
| $Ge^{4+}$ | | | | | | | | | | |
| $Al^{3+}$ | | | | | | | | | | |
| $Ti^{4+}$ | | | | | | | | | | |
| $Zr^{4+}$ | | | | | | | | | | |
| $Hf^{4+}$ | | | | | | | | | | |
| $Ta^{5+}$ | | | | | | | | | | |
| $W^{6+}$ | | | | | | | | | | |
| $Y^{3+}$ | | | | | | | | | | |

TABLE 8-continued

| | COMP. EX. 11 | COMP. EX. 12 | COMP. EX. 13 | COMP. EX. 14 | COMP. EX. 15 | COMP. EX. 16 | COMP. EX. 17 | COMP. EX. 18 | COMP. EX. 19 | COMP. EX. 20 |
|---|---|---|---|---|---|---|---|---|---|---|
| $Gd^{3+}$ | | | | | | | | | | |
| $Lu^{3+}$ | | | | | | | | | | |
| $Mg^{2+}$ | | | | | | | | | | |
| $Ca^{2+}$ | | | | | | | | | | |
| $Sr^{2+}$ | | | | | | | | | | |
| $Ba^{2+}$ | | | | | | | | | | |
| $Zn^{2+}$ | | | | | | | | | | |
| Total | 100 | 100 | 100 | 100 | 100 | 100 | 100 | 100 | 100 | 100 |
| VITRIFICATION | X | X | X | X | X | X | X | X | X | X |
| UV $\lambda_5$(nm) | | | | | | | | | | |
| IR $\lambda_5$(μm) | | | | | | | | | | |
| $n_d$ | | | | | | | | | | |
| $v_d$ | | | | | | | | | | |

TABLE 9

| | COMP. EX. 21 | COMP. EX. 22 | COMP. EX. 23 | COMP. EX. 24 | COMP. EX. 25 | COMP. EX. 26 |
|---|---|---|---|---|---|---|
| $La^{3+}$ | 45 | 50 | 55 | 60 | 65 | 70 |
| $Ga^{2+}$ | 55 | 50 | 45 | 40 | 35 | 30 |
| $Nb^{5+}$ | | | | | | |
| $B^{3+}$ | | | | | | |
| $Si^{4+}$ | | | | | | |
| $Ge^{4+}$ | | | | | | |
| $Al^{3+}$ | | | | | | |
| $Ti^{4+}$ | | | | | | |
| $Zr^{4+}$ | | | | | | |
| $Hf^{4+}$ | | | | | | |
| $Ta^{5+}$ | | | | | | |
| $W^{6+}$ | | | | | | |
| $Y^{3+}$ | | | | | | |
| $Gd^{3+}$ | | | | | | |
| $Lu^{3+}$ | | | | | | |
| $Mg^{2+}$ | | | | | | |
| $Ca^{2+}$ | | | | | | |
| $Sr^{2+}$ | | | | | | |
| $Ba^{2+}$ | | | | | | |
| $Zn^{2+}$ | | | | | | |
| Total | 100 | 100 | 100 | 100 | 100 | 100 |
| VITRIFICATION | X | X | X | X | X | X |
| UV $\lambda_5$(nm) | | | | | | |
| IR $\lambda_5$(μm) | | | | | | |
| $n_d$ | | | | | | |
| $v_d$ | | | | | | |

From the above, it was confirmed that the optical glass in all of Examples had the refractive index ($n_d$) of 1.85 to 2.25, the ultraviolet absorption edge wavelength (UV$\lambda_5$) of 370 nm or less, the infrared absorption edge wavelength (IR$\lambda_5$) of 6 μm or more, and the optical glass exhibited excellent transmissivity for the light from the ultraviolet to the mid-infrared while having the high refractive index.

What is claimed is:

1. Optical glass comprising:
   10 mol % to 60 mol % of a $La^{3+}$ in terms of mol % of cations;
   10 mol % or more and up to 75 mol % of a $Ga^{3+}$ in terms of mol % of cations; and
   at least one selected from a group consisting of $Nb^{5+}$, $Ti^{4+}$, and $Ta^{5+}$.

2. The optical glass according to claim 1, further comprising:
   0 mol % to 75 mol % of a $Nb^{5+}$ in terms of mol % of cations;
   0 mol % to 30 mol % of a $Ti^{4+}$ in terms of mol % of cations; and
   0 mol % to 30 mol % of a $Ta^{5+}$ in terms of mol % of cations.

3. The optical glass according to claim 1, further comprising:
   5 mol % to 60 mol % of a $Nb^{5+}$ in terms of mol % of cations;
   0 mol % to 20 mol % of a $Ti^{4+}$ in terms of mol % of cations; and
   5 mol % to 25 mol % of a $Ta^{5+}$ in terms of mol % of cations.

4. The optical glass according to claim 3, further comprising:
   10 mol % to 20 mol % of a $Ti^{4+}$ in terms of mol % of cations.

5. The optical glass according to claim 1, further comprising:
   10 mol % to 50 mol % of a $Nb^{5+}$ in terms of mol % of cations;

0 mol % to 10 mol % of a $Ti^{4+}$ in terms of mol % of cations; and 10 mol % to 20 mol % of a $Ta^{5+}$ in terms of mol % of cations.

6. The optical glass according to claim 1, further comprising at least one selected from a group consisting of $Zr^{4+}$, $Hf^{4+}$, $W^{6+}$, $Al^{3+}$, $B^{3+}$, $Si^{4+}$, $Ge^{4+}$, $Zn^{2+}$, $Y^{3+}$, $Gd^{3+}$, $Lu^{3+}$, $Mg^{2+}$, $Ca^{2+}$, $Sr^{2+}$, and $Ba^{2+}$.

7. The optical glass according to claim 6, further comprising:

0 mol % to 30 mol % of a $B^{3+}$ in terms of mol % of cations;

0 mol % to 20 mol % of a $Si^{4+}$ in terms of mol % of cations; and 0 mol % to 20 mol % of a $Ge^{4+}$ in terms of mol % of cations.

8. The optical glass according to claim 7, further comprising:

0 mol % to 10 mol % of a $B^{3+}$ in terms of mol % of cations;

0 mol % to 10 mol % of a $Si^{4+}$ in terms of mol % of cations; and 0 mol % to 10 mol % of a $Ge^{4+}$ in terms of mol % of cations.

9. The optical glass according to claim 7, wherein the total content of the $B^{3+}$, the $Si^{4+}$, and the $Ge^{4+}$ ($B^{3+}+Si^{4+}+Ge^{4+}$) is 0 mol % to 30 mol %, in terms of mol % of cations.

10. The optical glass according to claim 9, wherein the total content of the $B^{3+}$, the $Si^{4+}$, and the $Ge^{4+}$ ($B^{3+}+Si^{4+}+Ge^{4+}$) is 0 mol %.

11. The optical glass according to claim 6, further comprising:

0 mol % to 30 mol % of a $Zr^{4+}$ in terms of mol % of cations;

0 mol % to 30 mol % of a $Hf^{4+}$ in terms of mol % of cations;

0 mol % to 20 mol % of a $W^{6+}$ in terms of mol % of cations;

0 mol % to 30 mol % of a $Al^{3+}$ in terms of mol % of cations; and 0 mol % to 20 mol % of a $Zn^{2+}$ in terms of mol % of cations.

12. The optical glass according to claim 11, further comprising:

5 mol % to 20 mol % of a $Zr^{4+}$ in terms of mol % of cations;

5 mol % to 20 mol % of a $Hf^{4+}$ in terms of mol % of cations;

0 mol % to 10 mol % of a $W^{6+}$ in terms of mol % of cations;

0 mol % to 15 mol % of a $Al^{30}$ in terms of mol % of cations; and 0 mol % to 10 mol % of a $Zn^{2+}$ in terms of mol % of cations.

13. The optical glass according to claim 6, wherein a total content of a $Ln^{3+}$ (representing one or more of Ln=Y, Gd, and Lu) ($Y^{3+}+Gd^{3+}+Lu^{3+}$) is 0 mol % to 30 mol %, and a total mol % of an $R^{2+}$ (representing one or more of R=Mg, Ca, Sr, and Ba) ($Mg^{2+}+Ca^{2+}+Sr^{2+}+Ba^{2+}$) is 0 mol % to 20 mol %, in terms of mol % of cations.

14. The optical glass according to claim 13, wherein a total content of a $Ln^{3+}$ (representing one or more of Ln=Y, Gd, and Lu) ($Y^{3+}+Gd^{3+}+Lu^{3+}$) is 0 mol % to 20 mol %, and a total content of an $R^{2+}$ (representing one or more of R=Mg, Ca, Sr, and Ba) ($Mg^{2+}+Ca^{2+}+Sr^{2+}+Ba^{2+}$) is 0 mol % to 10 mol %, in terms of mol % of cations.

15. The optical glass according to claim 1, wherein a refractive index ($n_d$) in a d-line is 1.85 to 2.25.

16. The optical glass according to claim 1, wherein an Abbe number ($v_d$) is 19 to 37.

17. The optical glass according to claim 1, wherein a wavelength ($UV\lambda_5$) at which an ultraviolet transmittance value including a surface reflection loss becomes 5% per a thickness of 1 mm is 370 nm or less.

18. The optical glass according to claim 1, wherein a wavelength ($IR\lambda_5$) at which an infrared transmittance value including a surface reflection loss becomes 5% per a thickness of 1 mm is 6 μm or more.

19. An optical element comprising the optical glass according to claim 1.

20. An objective lens comprising the optical element according to claim 19.

21. A lens barrel comprising the optical element according to claim 19.

22. An optical apparatus comprising the optical element according to claim 19.

* * * * *

UNITED STATES PATENT AND TRADEMARK OFFICE
CERTIFICATE OF CORRECTION

PATENT NO. : 12,319,616 B2
APPLICATION NO. : 17/563760
DATED : June 3, 2025
INVENTOR(S) : Hiroyuki Inoue et al.

Page 1 of 1

It is certified that error appears in the above-identified patent and that said Letters Patent is hereby corrected as shown below:

In the Claims

Column 24, Line 7:
In Claim 12, delete "$Al^{30}$" and insert -- $Al^{3+}$ --.

Signed and Sealed this
Twenty-second Day of July, 2025

Coke Morgan Stewart
*Acting Director of the United States Patent and Trademark Office*